Oct. 29, 1957  F. POLLICK  2,811,076
TELEVISION EFFECTS CAMERA ADAPTER
Filed March 1, 1954  3 Sheets-Sheet 1
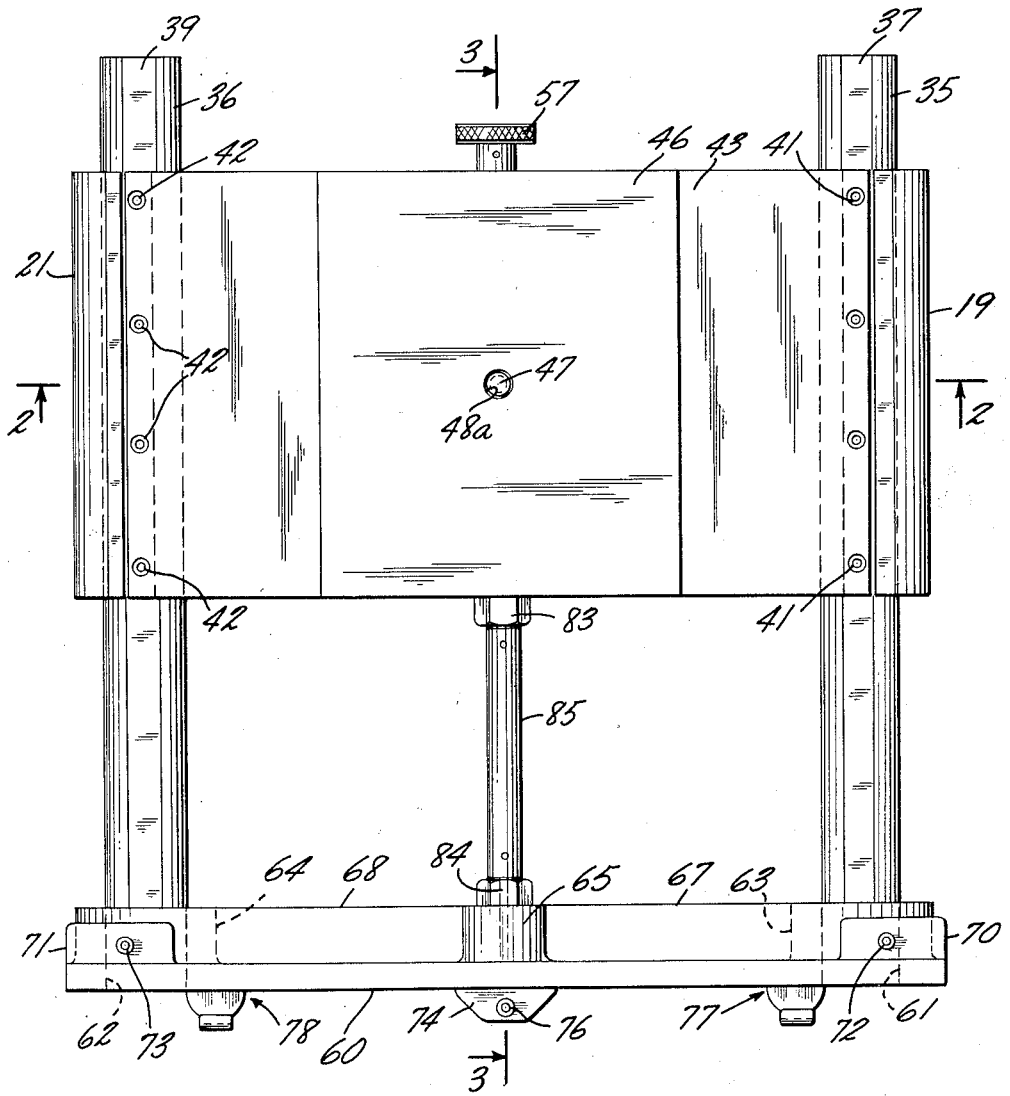
FIG. I.
INVENTOR.
FRANK POLLICK
BY
Campbell, Brumbaugh, Free + Graves
his ATTORNEYS.

Oct. 29, 1957   F. POLLICK   2,811,076
TELEVISION EFFECTS CAMERA ADAPTER
Filed March 1, 1954   3 Sheets-Sheet 2
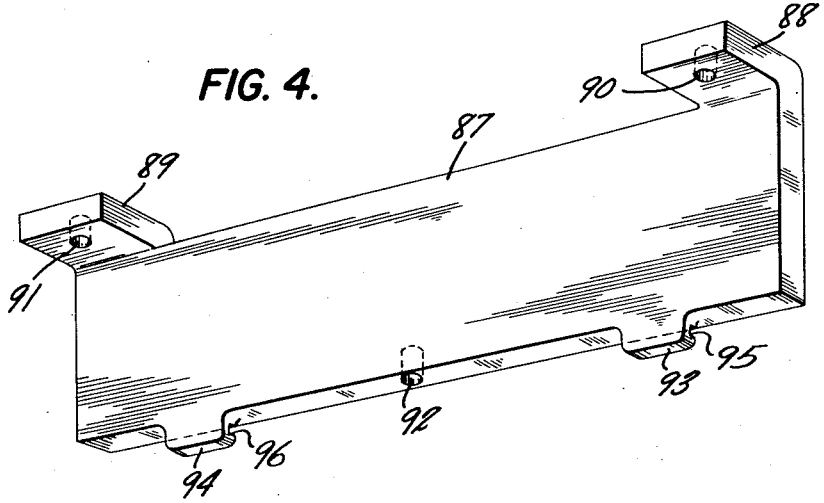
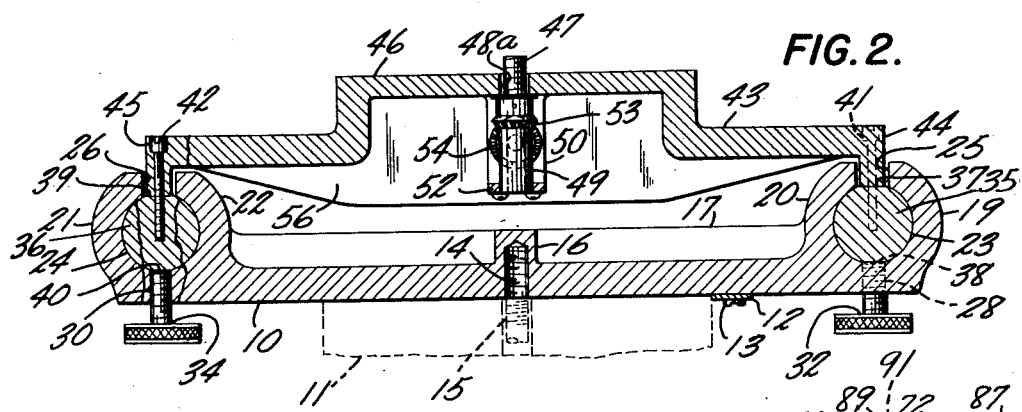
INVENTOR.
FRANK POLLICK
BY
Campbell, Brumbaugh, Free & Graves
his ATTORNEYS.

Oct. 29, 1957   F. POLLICK   2,811,076
TELEVISION EFFECTS CAMERA ADAPTER
Filed March 1, 1954   3 Sheets-Sheet 3
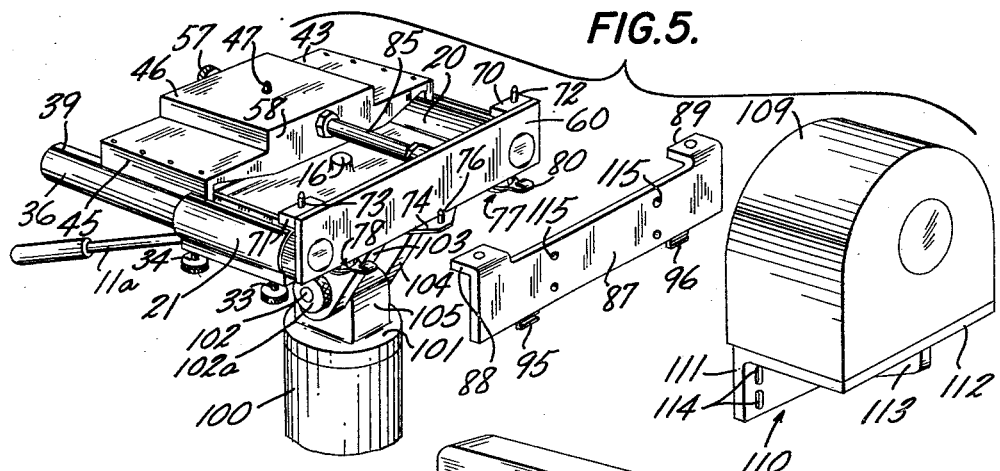
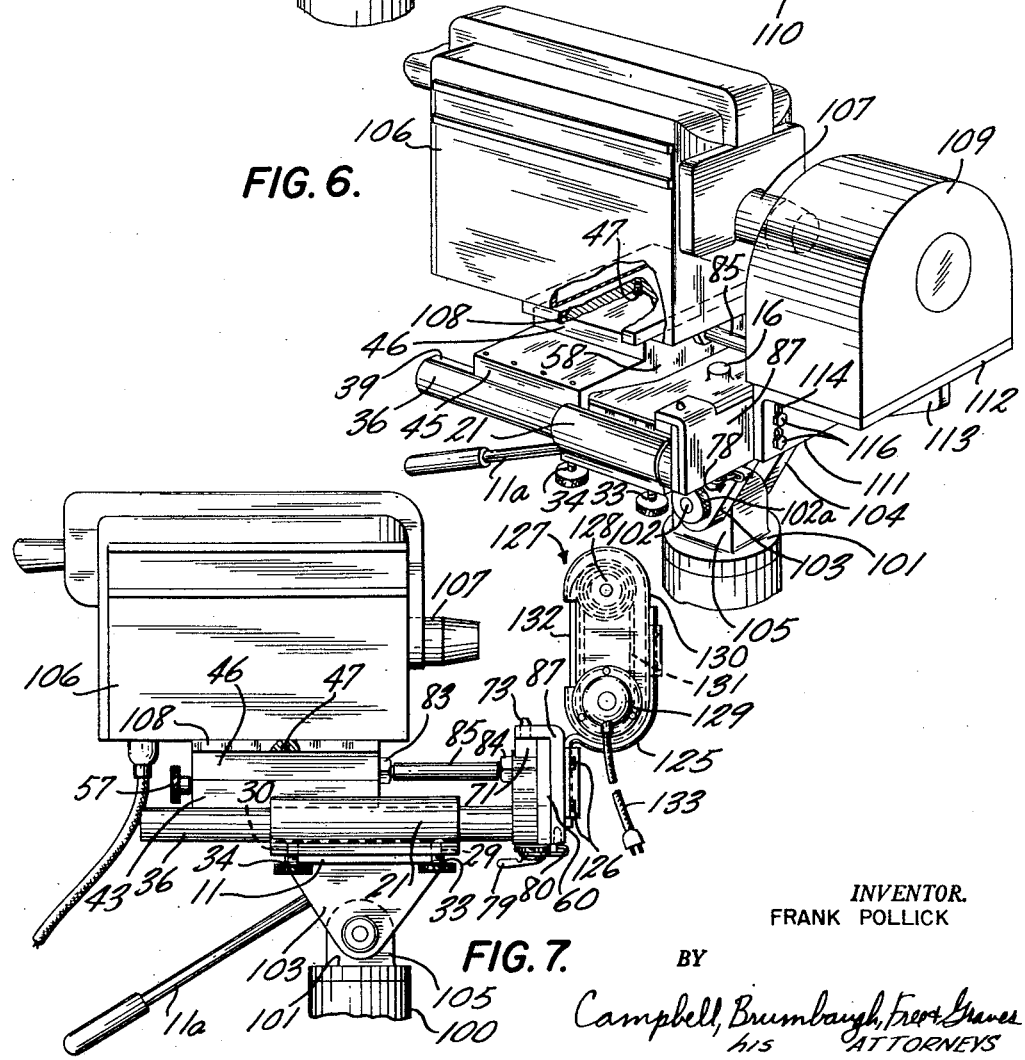
INVENTOR.
FRANK POLLICK
BY
Campbell, Brumbaugh, Free & Graves
his ATTORNEYS

United States Patent Office 2,811,076
Patented Oct. 29, 1957

2,811,076
TELEVISION EFFECTS CAMERA ADAPTER

Frank Pollick, Yonkers, N. Y., assignor to Columbia Broadcasting System, Inc., New York, N. Y., a corporation of New York Application March 1, 1954, Serial No. 413,152

9 Claims. (Cl. 88—16)

This invention relates to an adapter facilitating the positioning of various television effects attachments in the view field of a television camera.

The rapid growth of television pragramming has greatly increased the demand for special effects provided by devices adjacent the camera lens, such effects ranging from the televising of titles and synthetic rainstorms to the necessity for mounting heavy lens assemblies in front of the camera. Other effects attachments include angularly positioned mirrors mounted in front of the camera to effectively displace the camera lens with respect to the subject being televised.

The mounting of the above-mentioned television effects attachments has been complicated by the wide use of several types of television cameras as well as the great variety of such attachments. Thus, a device for mounting the attachments in the view field of one television camera could not be employed with another camera. Further, the mounting devices used in the past did not permit the rapid interchange of effects attachments in the camera view field, a deficiency that limited the number of attachments usable with a particular camera in a specified programming period.

Accordingly, it is an object of the present invention to provide a television effects camera adapter which may be disposed between a television camera and supporting platform to mount any desired effects attachment in the camera view field.

It is another object of the invention to provide an adapter as specified above which permits the camera and effects attachments to move with respect to the supporting platform for balancing the assembly thereon.

These and further objects of the invention are accomplished by providing a mounting base adapted to be fastened to a conventional television supporting platform. Slidably supported by the mounting base is a camera mount constructed with a mounting head thereon similar to the friction head found on the camera supporting platform. Positioned in front of the camera mount and movable therewith is a supporting member adapted to receive and support the effects attachments in the view field of a camera on the camera mount. Each of the effects attachments may have secured thereto a front plate formed to be removably clamped to the supporting member.

By providing for movement between the camera mount and the mounting base, the entire camera and adapter assembly together with the effects attachment may be suitably balanced on the supporting platform to facilitate the movement thereof.

Further objects and advantages of the invention will be more readily understood when the following description is read in connection with the accompanying drawings in which:

Figure 1 is a plan view of a television effects camera adapter constructed in accordance with the invention;

Figure 2 is a transverse section of the adapter taken on the view line 2—2 in Figure 1 looking in the direction of the arrows;

Figure 3 is a longitudinal section of the adapter taken on the view line 3—3 in Figure 1 looking in the direction of the arrows;

Figure 4 is a perspective view of a front plate that may be employed with the adapter illustrated in Figure 1;

Figure 5 is an exploded view in perspective illustrating a typical effects attachment that may be employed with the adapter illustrated in Figure 1;

Figure 6 is a perspective view partially broken away and illustrating, in addition to the apparatus shown in Figure 5, a television camera in assembled relation with the adapter; and Figure 7 is an elevation view of a television camera and a further effects attachment mounted on an adapter constructed in accordance with the invention.

Referring to Figures 1, 2 and 3 which illustrates in detail a typical embodiment of the invention, a mounting base 10 cast from aluminum, for example, is formed with a generally rectangular configuration in the horizontal plane and adapted to be received by and fastened to a conventional friction head 11, shown in dotted outline in Figure 2. In order to insure the proper alignment of the mounting base 10 on the friction head 11, a guide strip 12 is preferably affixed by bolts 13 to the lower face of the base 10. Also formed on the lower face and substantially in the center of the mounting base 10 is a tapped hole 14 extending into a boss 16 on the upper side of the base 10. Protruding from the friction head 11 is a rotatable screw 15 cooperating with the threaded hole 14 for securing the base 10 to the head 11. Also provided on the base 10 are stiffening ridges 17 and 18 extending upwardly from each end thereof.

Integral upwardly extending arcuate sections 19, 20 and 21, 22, respectively, are formed to extend longitudinally on both sides of the base 10. The arcuate sections 19 to 22, inclusive, are constructed to provide a pair of substantially cylindrical passages 23 and 24 open at their upper ends to form a pair of slots 25 and 26, respectively. Tapped openings 27, 28 and 29, 30 (Figure 7) extend from the lower face of the base 10 to the passages 23 and 24, respectively, and receive knurled headed set screws 31, 32 and 33, 34, respectively.

Slidably mounted in the passages 23 and 24 are a pair of substantially cylindrical supporting rods 35 and 36 preferably having flattened portions 37, 38 and 39, 40 on their upper and lower surfaces, respectively. It is evident that the flattened portions 38 and 40 will cooperate with the set screws 31 to 34, inclusive, to lock the rods 35 and 36 in any predetermined position with respect to the base 10.

Fastened to the flattened portions 37 and 39 on the upper surfaces of the rods 35 and 36 by a plurality of screws 41 and 42, respectively, is a camera mount 43. The screws 41 and 42 are inserted through openings formed in downwardly extending shoulders 44 and 45 formed on either side of the camera mount 43 and fitting freely into the slots 25 and 26, the screws 41 and 42 being received by corresponding tapped holes in the rods 35 and 36. As is evident from Figure 1, the camera mount 43 is constructed with a generally rectangular confiiguration when viewed in plan and is positioned a short distance from the back ends of the supports 35 and 36.

A preferably metallic mounting head 46, integral with and running longitudinally along the center of the camera mount 43, comprises a raised platform similar to th conventional friction mounting heads normally employe to support television cameras.

In order to secure a television camera to the moun ing head 46, a mounting screw 47, integral with a ver cal shaft 48 journaled in a bearing 49, is rotatable in an opening 48a substantially in the center of the mounting head 46. A rectangular support 50 and a tube 51 extend from the lower face of the mounting head 46 to the rear and in front of the shaft 48, respectively, the support 50 preferably being integral with the head 46 and the tube 51 being secured thereto by a screw 51a. A plate 52 holding the bearing 49 is supported at its ends by the support 50 and the tube 51. Affixed to the shaft 48 between the bearing 49 and the mounting head 46 is a beveled gear 53 cooperating with a beveled gear 54 on a shaft 55 extending through the support 50 and a vertical flange 56 formed on the back end of the camera mount 43, a similar flange 58 being constructed on the front end thereof. A knurled knob 57 is mounted on the end of the shaft 55, and it is evident that the mounting screw 47 may be rotated in either direction by suitably turning the knob 57.

A supporting member 60 of generally rectangular shape is constructed with a pair of cylindrical openings 61 and 62 at either side thereof, a pair of bosses 63 and 64 extending from the inner face of the member 60 from the openings 61 and 62, respectively. A further boss 65 provided with a tapped hole 66 is centrally positioned on the upper inner face of the member 60. Ribbing 67 and 68 may be formed on the inner face of the supporting member 60 and extends between the portions 63, 64 and 65. A rearwardly extending flange 69 may also be provided on the lower inner portion of the member 60, the ribs 67 and 68 and the flange 69 adding strength and rigidity to the member 60.

A pair of keying blocks 70 and 71 are fastened by conventional means to the upper outer corners on the inner face of the member 60, each of the blocks 70 and 71 being provided with an upwardly extending tapered stud 72 and 73 centrally disposed thereon. A keying plate 74 is secured by screws 75 to the flange 69 at the center of the member 60. A tapered stud 76, similar to the studs 72 and 73, extends from the keying plate 74. Also found on the flange 69 are a pair of locks 77 and 78 which take the form, for example of conventional window type locks provided with handles 79 and J-shaped clamping members 80 functioning as will be explained in detail below.

As clearly shown in Figures 1 and 3, the openings 61 and 62 and their associated bosses 63 and 64 receive the rods 35 and 36 which may be secured therein by, for example, set screws 81. Also extending between the mounting plate 43 and the supporting member 60 is a shaft 82 threaded at both ends and received by a tapped opening 58a in the flange 58 and by the tapped hole 66 in the boss 65. Nuts 83 and 84 lock the shaft 82 in position and if desired, a cover 85 may be provided thereon. This construction provides for a strong and rigid assembly of the mounting plate 43 and the supporting member 60.

With the television adapter constructed as described, it is apparent that after the mounting base 10 is positioned on the friction head 11, the rods 35 and 36 together with the camera mount 43 and the supporting member 60 may be placed in any desired position with respect to the mounting base 10 and friction head 11. In order to prevent the complete withdrawal of the rods 35 and 36 from the passages 23 and 24, a stop 86 (Figure 3) is preferably inserted on the end of the rod 35 remote from the member 60.

Referring next to Figures 3 and 4, a typical embodiment of a front plate 87 adapted to cooperate with the supporting member 60 is shown. Preferably, the plate 87 as approximately the same overall dimensions as the member 60 and is provided with lugs 88 and 89 extending laterally at both ends from the upper edge thereof, openings 90 and 91 being formed in the lugs 88 and 89, respectively. A centrally located hole 92 is also found in the lower edge of the plate 87. Vertical tabs 93 and 94 are formed with slots 95 and 96, respectively, on their front faces, and project vertically from the front plate 87.

As partially shown in dotted outline in Figure 3, the openings 90 and 91 receive the studs 72 and 73 while the hole 92 receives the stud 76. After positioning the studs 72, 73 and 76 in their respective openings, the J-shaped members 80 of the locks 77 and 78 are placed adjacent to the slots 95 and 96 and the levers 79 actuated to securely clamp the front plate 87 to the supporting member 60.

In order to permit the front plate 87 to be fastened to and support various television effects attachments in the view field of a particular type of television camera, a number of suitably positioned holes (not shown) are provided therein. It is preferable to supply a plate 87 for each of the effects attachments to be employed.

Heavy lens assemblies, such as shown in Figures 5 and 6, find extensive use in telecasting. In these figures, the adapter is mounted on conventional supporting apparatus permitting rotation of the friction head 11 (Figure 7) by an adjusting handle 11a, the head 11 being carried by a plate 101 rotatably supported on a pedestal 100. Furthermore, the camera may be moved in elevation about an axis defined by a shaft 102 extending through supporting elements 103 and 104 joined to the friction head 11, the elements 103 and 104 being positioned on opposite sides of a mounting housing 105 integral with the plate 101. The shaft 102 may be threaded to receive a knurled knob 102a for locking the head 11 in a desired position.

A conventional television camera 106, fitted with a normal lens 107, is provided with a conventional base plate 108 affixed to the bottom thereof. The camera 106 is placed upon the adapter with the base 108 resting on the mounting head 46, a tapped hole being provided in the base 108 to receive the mounting screw 47 as the knob 57 is rotated.

To mount a lens assembly 109 in front of the camera lens 107, a lens bracket 110, formed by two perpendicular slides 111 and 112 with a strengthening element 113 therebetween, is provided to fasten the lens assembly 109 to the front plate 87. The lens assembly 109 is directly mounted on the horizontal supporting side 112 in any convenient manner such as by suitable bolts (not shown). The side 111 has a plurality of elongated openings 114 formed therein cooperating with tapped holes 115 in the supporting member 87. Screws 116 are inserted to attach the lens bracket 110 to the plate 87, the elongated shape of the holes 114 permitting adjustment of the bracket 110 to line up the lenses 107 and 109.

Since the lens assembly 109 is very heavy, the set screws 31 to 34, inclusive, are loosened to permit the camera 106, the camera mount 43, the rods 35 and 36 and the supporting member 60 to be moved rearwardly for balancing them with respect to the pedestal 100. This balanced condition greatly facilitates the movement of the camera 106 by means of the handle 11a. Since the lens assembly 109 is one of the heaviest of the attachments for the television effects camera adapter, the camera mount 43 is rearwardly displaced as far as possible in Figures 5 and 6, the adapter having been designed to be balanced in such a position with this attachment.

Referring next to Figure 7, another television effects attachment is shown in position on the supporting member 60 in front of the camera 106. A bracket 125 is fixed to the front plate 87 by means of screws 126. The bracket 125 is attached at its other end to a crawl attachment 127 comprising a roll 128 and an electric motor 129 mounted in a housing 130, the motor 129 driving through a drive chain 131 the roll 128. An elongated strip 132 is wound on the roll 128 and extends to another roll behind the motor 129, the strip 132 having disposed thereon titles or other material to be telecast. If desired, a light may also be supported by the bracket 125 to illuminate the strip 132. In a typical example, it may be desirable to employ a smoothly faced cloth tape having a black background with white lettering spelling out, for example, the performers names.

It will be noted that in Figure 7, the camera 106 is balanced on the pedestal 100 with the camera mount 43 and the rods 35 and 36 somewhat forward of the position shown in Figures 5 and 6, this being due to the lighter weight of the roll attachment 127 as compared with the lens assembly 109. Although little movement of the camera 106 is necessary when the crawl 127 is employed, if effects attachments such as mirrors are positioned on the supporting member 60, it is desirable to have the camera 106 in balance to facilitate the movement thereof.

It will be understood that other effects attachments may be affixed to the plate 87 including various mirrors, as specified above, for changing the effective position of the lens 107, rotating cylinders having sandpaper thereon to imitate rain, and various other devices well known in the television art.

Accordingly, it can be seen that a television effects adapter has been provided that is easily positioned between the television camera supporting platform and the camera to permit a variety of effects attachments to be utilized therewith. Of course, it will be understood that the above-described embodiments of the invention are illustrative only and modifications thereof will occur to those skilled in the art. For example, the supporting member 60 may be provided with any desired keying and clamping elements for receiving the front plates secured to the effects attachments. Further, the front plate 87 may take various other forms suitable to the effects attachment mounted thereon to position it in the camera view field. Alternatively, the front plate may be formed as an element of the effects attachment designed to be shifted thereon to position the attachment in the view field of any of the several television cameras. Therefore, the invention is not to be limited to the specific apparatus disclosed herein but is to be defined by the appended claims.

I claim:

1. A television effects camera adapter comprising a mounting base adapted to be fastened to a television camera supporting platform, means forming a pair of passages in the base extending longitudinally thereof, a rod slidably disposed in each of said passages, a camera mount supported by said rods and adapted to receive a television camera thereon, and a supporting member carried by said rods in front of said camera mount, said member being adapted to receive and support television effects attachments in the view field of the television camera.

2. Apparatus as defined in claim 1 wherein means are provided for locking said mounting base and said rods.

3. Apparatus as defined in claim 1 including a threaded shaft adapted to enter and engage a threaded opening in the television camera extending upwardly from said camera mount, and means for rotating said threaded shaft from a remote position for securing the television camera to the camera mount.

4. Apparatus as defined in claim 1 wherein a front plate is removably carried by said supporting member, said front plate being adapted to be secured to the television effects attachments.

5. A television effects camera adapter comprising a mounting base adapted to be fastened to a television camera supporting platform, means forming a pair of passages on both sides of said base extending longitudinally thereof, each of said passages being formed with a slot along their upper portions, a rod slidably disposed in each of said passages, a camera mount carried by said rods, portions of said camera mount extending through said slots to permit relative movement between said mounting base and said camera mount, said camera mount including a mounting head adapted to receive a television camera thereon, and a supporting member carried by said rods in front of said camera mount, said member being adapted to receive and support television effects attachments in the view field of the television camera.

6. Apparatus as defined in claim 5 wherein means are provided for locking said mounting base and said rods.

7. Apparatus as defined in claim 5 including a threaded shaft adapted to enter and engage a threaded opening in the television camera extending upwardly from said mounting head, and means for rotating said threaded shaft from a remote position for securing the television camera to the camera mount.

8. Apparatus as defined in claim 5 wherein a front plate is removably carried by said supporting member, said front plate being adapted to be secured to the television effects attachments.

9. Apparatus as defined in claim 8 wherein means are provided to clamp said front plate to said supporting member.

References Cited in the file of this patent

UNITED STATES PATENTS

| | | |
|---|---|---|
| 1,292,149 | Teague | June 21, 1919 |
| 1,892,846 | Mueller | Jan. 3, 1933 |
| 1,971,486 | Jennings et al. | Aug. 28, 1934 |
| 2,578,420 | Goodale et al. | Dec. 11, 1951 |

FOREIGN PATENTS

| | | |
|---|---|---|
| 521,150 | Great Britain | May 14, 1940 |
| 918,794 | France | Nov. 4, 1946 |